US009773317B2

(12) United States Patent
Lu et al.

(10) Patent No.: US 9,773,317 B2
(45) Date of Patent: Sep. 26, 2017

(54) PEDESTRIAN TRACKING AND COUNTING METHOD AND DEVICE FOR NEAR-FRONT TOP-VIEW MONITORING VIDEO

(71) Applicant: ZTE Corporation, Shenzhen, Guangdong (CN)

(72) Inventors: Ping Lu, Shenzhen (CN); Jian Lu, Shenzhen (CN); Gang Zeng, Shenzhen (CN)

(73) Assignee: XI'AN ZHONGXING NEW SOFTWARE CO. LTD., Xi'an (CN)

( * ) Notice: Subject to any disclaimer, the term of this patent is extended or adjusted under 35 U.S.C. 154(b) by 94 days.

(21) Appl. No.: 14/648,066

(22) PCT Filed: Sep. 3, 2013

(86) PCT No.: PCT/CN2013/082876
§ 371 (c)(1),
(2) Date: May 28, 2015

(87) PCT Pub. No.: WO2013/189464
PCT Pub. Date: Dec. 27, 2013

(65) Prior Publication Data
US 2015/0317797 A1 Nov. 5, 2015

(30) Foreign Application Priority Data
Nov. 28, 2012 (CN) .......................... 2012 1 0495491

(51) Int. Cl.
*G06T 7/00* (2017.01)
*G06K 9/00* (2006.01)
(Continued)

(52) U.S. Cl.
CPC ........ *G06T 7/0081* (2013.01); *G06K 9/00778* (2013.01); *G06T 7/11* (2017.01);
(Continued)

(58) Field of Classification Search
None
See application file for complete search history.

(56) References Cited

U.S. PATENT DOCUMENTS 7,003,136 B1 * 2/2006 Harville ............. G06K 9/00201
348/169
7,227,893 B1 * 6/2007 Srinivasa ........... G06K 9/00771
348/155
(Continued)

FOREIGN PATENT DOCUMENTS

CN 101325690 A 12/2008
CN EP 2128818 A1 * 12/2009 ......... G06K 9/00785
(Continued)

OTHER PUBLICATIONS

International Search Report in international application No. PCT/CN2013/082876, mailed on Nov. 28, 2013.
(Continued)

*Primary Examiner* — Tsung-Yin Tsai
(74) *Attorney, Agent, or Firm* — Oppedahl Patent Law Firm LLC

(57) ABSTRACT

Provided are a pedestrian tracking and counting method and device for a near-front top-view monitoring video, wherein the method includes that a video image under a current monitoring scene is acquired, the acquired video image is compared with a background image, and when it is determined that the video image is a foreground image, each blob in the foreground image is segmented and combined to acquire a target blob representing an individual pedestrian, and tracking and counting are performed according to the center-of-mass coordinate of each target blob in a detection area to acquire the number of pedestrians under the current monitoring scene. Thus the accuracy of a counting result can be improved.

14 Claims, 3 Drawing Sheets

(51) Int. Cl.
*G06T 7/11* (2017.01)
*G06T 7/174* (2017.01)
*G06T 7/246* (2017.01)
*G06T 7/62* (2017.01)
*G06T 7/66* (2017.01)
*G06T 7/194* (2017.01)

(52) U.S. Cl.
CPC .............. *G06T 7/174* (2017.01); *G06T 7/194* (2017.01); *G06T 7/251* (2017.01); *G06T 7/62* (2017.01); *G06T 7/66* (2017.01); *G06T 2207/10016* (2013.01); *G06T 2207/20224* (2013.01); *G06T 2207/30196* (2013.01); *G06T 2207/30232* (2013.01); *G06T 2207/30242* (2013.01)

(56) References Cited

U.S. PATENT DOCUMENTS

| | | | |
|---|---|---|---|
| 2003/0107649 A1* | 6/2003 | Flickner | G06K 9/00362 348/150 |
| 2006/0204077 A1* | 9/2006 | Lim | G06K 9/00771 382/154 |
| 2006/0239558 A1* | 10/2006 | Rafii | G06K 9/00201 382/181 |
| 2010/0046797 A1* | 2/2010 | Strat | G06K 9/00778 382/103 |
| 2012/0027299 A1 | 2/2012 | Ran | |
| 2013/0136350 A1* | 5/2013 | Pai | G06T 7/194 382/165 |

FOREIGN PATENT DOCUMENTS

| | | |
|---|---|---|
| CN | 102096813 A | 6/2011 |
| CN | 102622578 A | 8/2012 |
| WO | 2012012555 A1 | 1/2012 |

OTHER PUBLICATIONS

English Translation of the Written Opinion of the International Search Authority in international application No. PCT/CN2013/082876, mailed on Nov. 28, 2013.

Supplementary European Search Report in European application No. 13806468.8, dated Aug. 3, 2016.

Damien Lefloch et al:"Real-time people counting system using a single video camera",Optical Sensing II, vol. 6811, Feb. 14, 2008 (Feb. 14, 2008), p. 681109,XP055290560, 1000 20th St. Beijingham WA 98225-6705 USA, ISSN: 0277-786X, DOI:10.1117/12.766499, ISBN: 978-1-62841-971-9.

Ryan D et al:"Crowd Counting Using Group Tracking and Local Features", Advanced Video and Signal Based Surveillance (AVSS), 2010 Seventh IEEE International Conference on, IEEE, Piscataway, NJ, USA, Aug. 29, 2010(Aug. 29, 2010), pp. 218-224, XP031772251, ISBN: 978-1-4244-8310-5.

* cited by examiner

PEDESTRIAN TRACKING AND COUNTING METHOD AND DEVICE FOR NEAR-FRONT TOP-VIEW MONITORING VIDEO

TECHNICAL FIELD

The present disclosure relates to an intelligent video monitoring technology, and particularly to a pedestrian tracking and counting method and device for a near-front top-view monitoring video.

BACKGROUND

At present, intelligent video monitoring has been widely applied in many fields, and pedestrian tracking and counting via a near-front top-view monitoring video is a typical application of intelligent video monitoring.

However, an existing technology for pedestrian tracking and counting via a near-front top-view monitoring video can only count separated pedestrians accurately, but fails to count a plurality of stuck pedestrians accurately. Since a plurality of pedestrians are usually stuck in a crowded occasion, such as a subway, a department store and so on, the existing technology for pedestrian tracking and counting via a near-front top-view monitoring video acquires a counting result with relatively low accuracy and thus fails to play a due role.

SUMMARY

In view of this, embodiments of the present disclosure provide a pedestrian tracking and counting method and device for a near-front top-view monitoring video so as to improve the accuracy of a counting result.

Technical solutions of the embodiments of the present disclosure are implemented by the following way to achieve the purpose.

An embodiment of the present disclosure provides a pedestrian tracking and counting method for a near-front top-view monitoring video. The method includes that:

a video image under a current monitoring scene is acquired;

the video image is compared with a background image, and when it is determined that the video image is a foreground image, each blob in the foreground image is segmented and combined to acquire a target blob representing an individual pedestrian; and tracking and counting are performed according to a centre-of-mass coordinate of each target blob in a detection area to acquire the number of pedestrians under the current monitoring scene.

Preferably, segmenting each blob in the foreground image may include that:

a blob having a width of a circumscribed rectangle of the blob greater than twice a threshold $T_W$ of a width of an individual is segmented by equal width according to $T_W$;

a blob having a height of a circumscribed rectangle of the blob greater than twice a threshold $T_H$ of a height of an individual is segmented by equal height according to $T_H$; and a blob having an area smaller than a predetermined threshold is deleted, wherein the blob is acquired after the segmenting.

Preferably, combining each blob in the foreground image may include that:

two blobs having a centre-of-mass horizontal distance not exceeding $T_W$ and a centre-of-mass longitudinal distance not exceeding $T_H$ are combined;

the width of a circumscribed rectangle of each acquired combined blob is divided by $T_W$ and then is subjected to rounding to acquire $N_W$, and the height of the circumscribed rectangle is divided by $T_H$ and then is subjected to rounding to acquire $N_H$;

whether $N_W$ and $N_H$ of each combined blob are smaller than 2 is determined respectively; if greater than 2, then the combined blob is split; if smaller than 2, then the combined blob is retained; and the three foregoing steps are repeated until all blobs are combined.

Preferably, after it is determined that the video image is a foreground image, the method may further include that:

a background image and a background amplitude are updated with different updating rate coefficients according to an image of a current frame.

Preferably, performing tracking may include that:

each target blob in the detection area is tracked using a nearest proximity matching algorithm, wherein a cost function applied by the nearest proximity matching algorithm is a Euclidean distance.

An embodiment of the present disclosure provides a pedestrian tracking and counting device for a near-front top-view monitoring video. The device includes:

a video image acquiring unit, configured to acquire a video image under a current monitoring scene;

a target blob acquiring unit, configured to compare the video image with a background image, and when it is determined that the video image is a foreground image, segment and combine each blob in the foreground image to acquire a target blob representing an individual pedestrian;

a pedestrian number counting unit, configured to perform tracking and counting according to a centre-of-mass coordinate of each target blob in a detection area to acquire the number of pedestrians under the current monitoring scene.

Preferably, the target blob acquiring unit may be configured to:

segment a blob having a width of a circumscribed rectangle of the blob greater than twice a threshold $T_W$ of the width of an individual by equal width according to $T_W$;

segment a blob having a height of a circumscribed rectangle of the blob greater than twice a threshold $T_H$ of the height of an individual by equal height according to $T_H$; and delete a blob having an area smaller than a predetermined threshold, wherein the blob is acquired after the segmenting.

Preferably, the target blob acquiring unit may be further configured to:

combine two blobs having a centre-of-mass horizontal distance not exceeding $T_W$ and a centre-of-mass longitudinal distance not exceeding $T_H$;

divide the width of a circumscribed rectangle of each acquired combined blob by $T_W$ and then perform rounding to acquire $N_W$, and divide the height of the circumscribed rectangle by $T_H$ and then perform rounding to acquire $N_H$;

determine whether $N_W$ and $N_H$ of each combined blob are smaller than 2 respectively; if greater than 2, then split the combined blob; if smaller than 2, then retain the combined blob; and repeat the three foregoing steps until all blobs are combined.

Preferably, the device may further include:

an updating unit, configured to update a background image and a background amplitude with different updating rate coefficients according to an image of a current frame.

Preferably, the pedestrian number counting unit may be configured to track each target blob in the detection area using a nearest proximity matching algorithm, wherein a cost function applied by the nearest proximity matching algorithm is a Euclidean distance.

It may be learned from the foregoing that the technical solutions of the embodiments of the present disclosure include that a video image under a current monitoring scene is acquired; the acquired video image is compared with a background image; when it is determined that the video image is a foreground image, each blob in the foreground image is segmented and combined to acquire a target blob representing an individual pedestrian; tracking and counting are performed according to the centre-of-mass coordinate of each target blob in a detection area to acquire the number of pedestrians under the current monitoring scene. Thus, the accuracy of a counting result can be improved.

DETAILED DESCRIPTION

Figure 1:
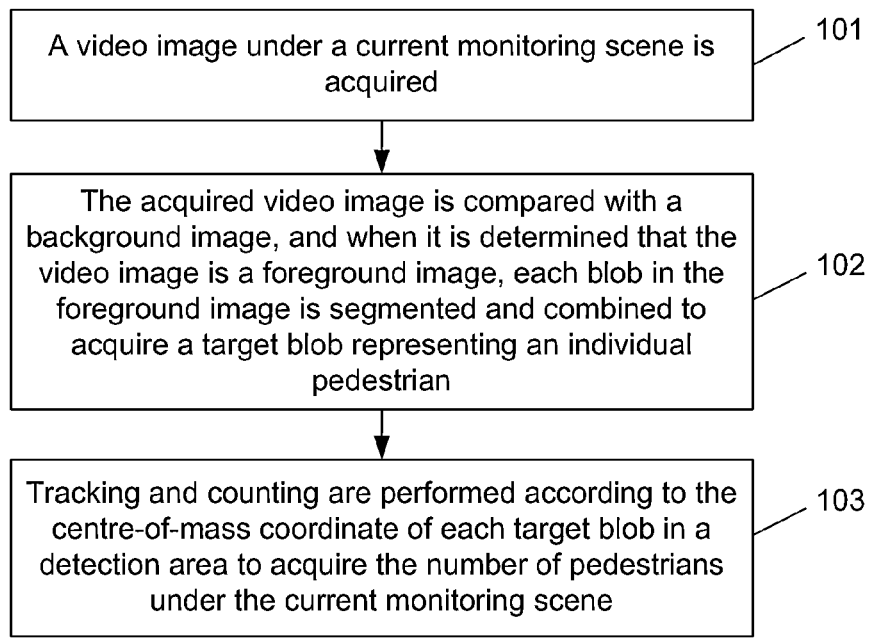
FIG. 1 is a diagram of an implementation process of a pedestrian tracking and counting method for a near-front top-view monitoring video according to a first embodiment of the present disclosure.

FIG. 1 shows a first embodiment of a pedestrian tracking and counting method for a near-front top-view monitoring video according to the present disclosure. The method includes the following steps:

Step 101: A video image under a current monitoring scene is acquired;

Step 102: The acquired video image is compared with a background image, and when it is determined that the acquired video image is a foreground image, each blob in the foreground image is segmented and combined to acquire a target blob representing an individual pedestrian; and Step 103: Tracking and counting are performed according to the centre-of-mass coordinate of each target blob in a detection area to acquire the number of pedestrians under the current monitoring scene.

Preferably, segmenting each blob in the foreground image includes that:

a blob having a width of a circumscribed rectangle of the blob greater than twice a threshold $T_W$ of the width of an individual is segmented by equal width according to $T_W$;

a blob having a height of a circumscribed rectangle of the blob greater than twice a threshold $T_H$ of the height of an individual is segmented by equal height according to $T_H$; and a blob having an area smaller than a predetermined threshold is deleted, wherein the blob is acquired after the segmenting.

Preferably, combining each blob in the foreground image includes that:

two blobs having a centre-of-mass horizontal distance not exceeding $T_W$ and a centre-of-mass longitudinal distance not exceeding $T_H$ are combined;

the width of a circumscribed rectangle of each acquired combined blob is divided by $T_W$ and then is subjected to rounding to acquire $N_W$, and the height of the circumscribed rectangle is divided by $T_H$ and then is subjected to rounding to acquire $N_H$;

whether $N_W$ and $N_H$ of each combined blob are smaller than 2 is determined respectively; if greater than 2, then the combined blob is split; if smaller than 2, then the combined blob is retained; and the three foregoing steps are repeated until all blobs are combined.

Preferably, after it is determined that the acquired video image is a foreground image, the method further includes that:

a background image and a background amplitude are updated with different updating rate coefficients according to an image of a current frame.

Preferably, performing the tracking includes that:

each target blob in the detection area is tracked using a nearest proximity matching algorithm, wherein a cost function applied by the nearest proximity matching algorithm is a Euclidean distance.

Figure 2:
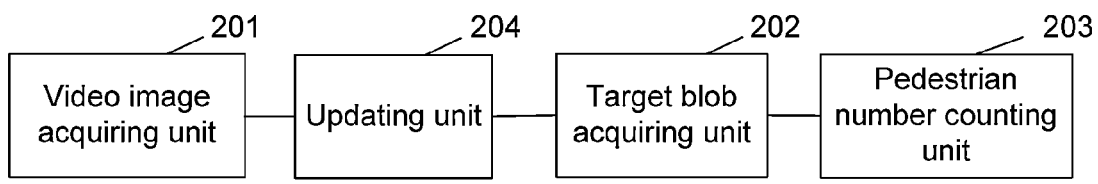
FIG. 2 is a structural diagram of a pedestrian tracking and counting device for a near-front top-view monitoring video according to an embodiment of the present disclosure.

FIG. 2 shows a pedestrian tracking and counting device for a near-front top-view monitoring video according to the present disclosure. The device includes:

a video image acquiring unit 201, configured to acquire a video image under a current monitoring scene;

a target blob acquiring unit 202, configured to compare the acquired video image with a background image, and when it is determined that the acquired video image is a foreground image, segment and combine each blob in the foreground image to acquire a target blob representing an individual pedestrian; and a pedestrian number counting unit 203, configured to perform tracking and counting according to the centre-of-mass coordinate of each target blob in a detection area to acquire the number of pedestrians under the current monitoring scene.

Preferably, the target blob acquiring unit 202 is configured to segment a blob having a width of a circumscribed rectangle of the blob greater than twice a threshold $T_W$ of the width of an individual by equal width according to $T_W$;

segment a blob having a height of a circumscribed rectangle of the blob greater than twice a threshold $T_H$ of the height of an individual by equal height according to $T_H$;

delete a blob having an area smaller than a predetermined threshold, wherein the blob is acquired after the segmenting.

Preferably, the target blob acquiring unit 202 is further configured to combine two blobs having a centre-of-mass horizontal distance not exceeding $T_W$ and a centre-of-mass longitudinal distance not exceeding $T_H$;

divide the width of a circumscribed rectangle of each acquired combined blob by $T_W$ and then perform rounding to acquire $N_W$, and divide the height of the circumscribed rectangle by $T_H$ and then perform rounding to acquire $N_H$;

determine whether $N_W$ and $N_H$ of each combined blob are smaller than 2 respectively; if greater than 2, then split the combined blob; and if smaller than 2, then retain the combined blob; and repeat the three foregoing steps until all blobs are combined.

Preferably, as shown in FIG. 2, the device further includes:

an updating unit 204, configured to update a background image and a background amplitude with different updating rate coefficients according to an image of a current frame.

Preferably, the pedestrian number counting unit 203 is configured to track each target blob in the detection area using a nearest proximity matching algorithm, wherein a cost function applied by the nearest proximity matching algorithm is a Euclidean distance.

In a practical application, the video image acquiring unit 201 may be implemented by a camera.

The target blob acquiring unit 202, the pedestrian number counting unit 203 and the updating unit 204 may be implemented by a Central Processing unit (CPU), a Digital Signal Processor (DSP) or a Field-Programmable Gate Array (FPGA).

In a practical application, the pedestrian tracking and counting device for a near-front top-view monitoring video may be applied in a video monitoring apparatus.

Figure 3:
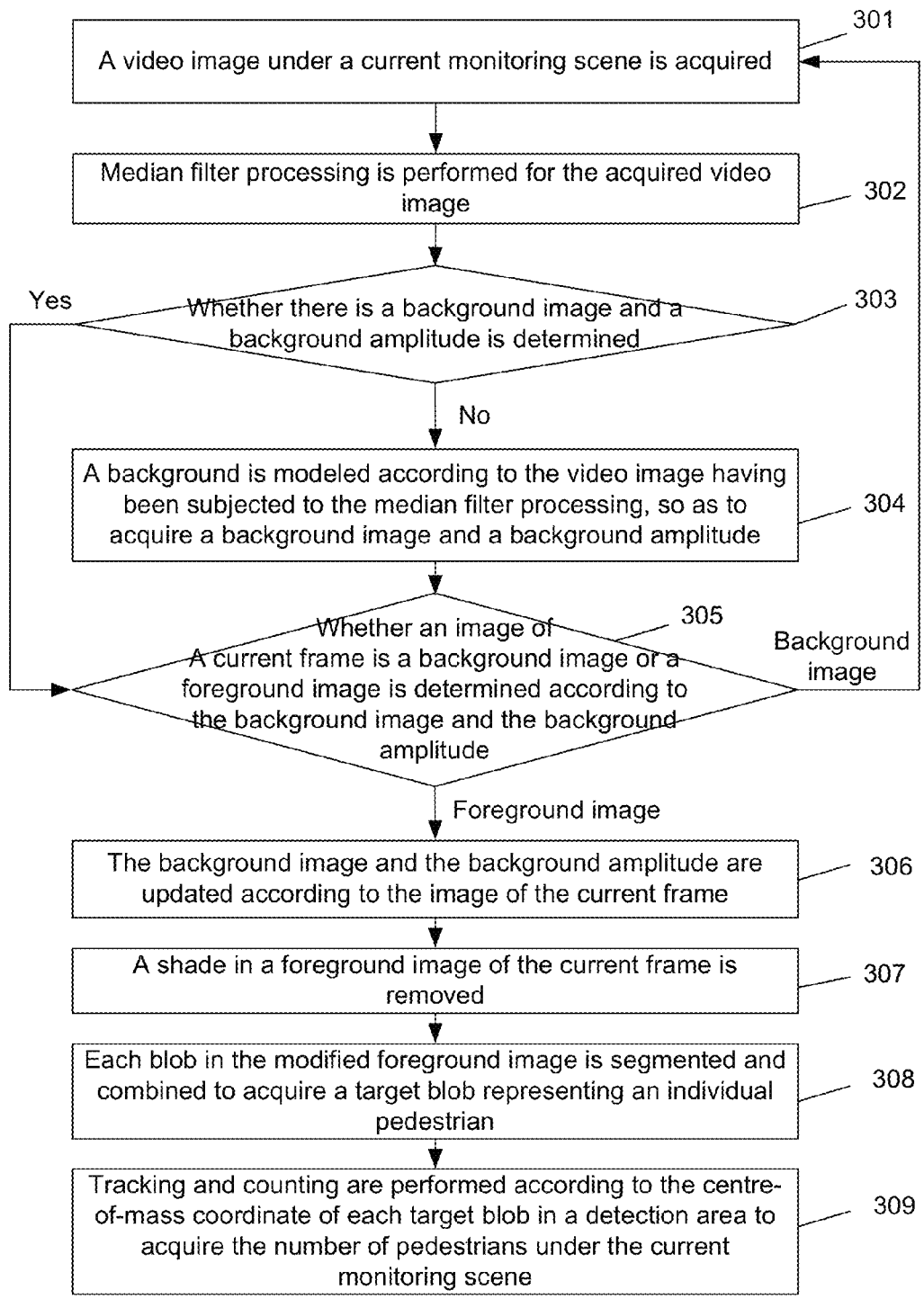
FIG. 3 is a diagram of an implementation process of a pedestrian tracking and counting method for a near-front top-view monitoring video according to a second embodiment the present disclosure.

A second embodiment of a pedestrian tracking and counting method for a near-front top-view monitoring video according to the present disclosure will be introduced below in combination with FIG. 3.

Step 301 includes that a video image under a current monitoring scene is acquired.

Step 302 includes that median filter processing is performed for the acquired video image.

Specifically, a 3*3 rectangular sliding filter window is selected. The signal amplitudes of 9 different or same pixels in the window are sorted by size, and a median signal amplitude of the sequence is outputted as the signal amplitude of a central pixel of the window.

Step 303 includes that whether there is a background image and a background amplitude is determined. When there are no background image and background amplitude, Step 304 is performed. When there are background image and background amplitude, Step 305 is performed.

Step 304 includes that a background is modeled according to the video image having been subjected to the median filter processing, so as to acquire a background image and a background amplitude.

Specifically, an average value of video images of M initial frames is calculated to acquire an average image as the background image. A standard deviation between images of N frames and an initial background is calculated, and a value which is $\sqrt{2}$ times of the standard deviation is used as the background amplitude.

Step 305 includes that whether an image of a current frame is a background image or a foreground image is determined according to the background image and the background amplitude. When it is determined that the image is a foreground image, Step 306 is performed. When it is determined that the image is a background image, Step 301 is performed again.

Specifically, the inputted video image is compared with an initial background image and an initial background amplitude. If the signal amplitudes of three channels of pixels in the inputted video image are all in an amplitude range of the signal amplitudes of pixels of the background image, it is determined that the video image is a background image. If the signal amplitudes of three channels of pixels in the inputted video image are not all in an amplitude range of the signal amplitudes of pixels of the background image, it is determined that the video image is a foreground image.

Step 306 includes that the background image and the background amplitude are updated according to the image of the current frame.

Specifically, a standard deviation between the image of the current frame and the background image is calculated and the signal amplitude of the image of the current frame is obtained. The background image and the background amplitude are updated with different updating rate coefficients according to a foreground part and a background part of the image of the current frame by using an averaged sliding method. The background part is updated with a relatively high rate while the background amplitude is updated with a relatively low rate. The background part is updated with a relatively high rate in order to keep acquiring an accurate background so as to adapt to a slow background change. The background amplitude is updated with a relatively low rate in order to adapt to a sudden background change caused by addition of a new background object and so on.

Step 307 includes that a shade in a foreground image of the current frame is removed.

Specifically, the image of the current frame and the background image are transferred from a Red-Green-Blue (RGB) space into a Hue-Saturation-Value (HSV) space. Hues and saturations are normalized into a range of 0 to 1, and lightness is normalized into a range of 0 to 255. Foreground pixels of the image of the current frame are compared with corresponding pixels of the background image in the HSV space. If a hue and saturation difference of a pixel is smaller than a predetermined hue and saturation threshold and a lightness ratio is smaller than a predetermined lightness ratio threshold, it is determined that the pixel is a shade, and the pixel is removed from the foreground image so as to acquire a modified foreground image.

Step 308 includes that each blob in the modified foreground image is segmented and combined to acquire a target blob representing an individual pedestrian.

Specifically the step 308 includes step 3081 to step 3089. Step 3081 includes that a blob having a width of a circumscribed rectangle of the blob greater than twice a threshold $T_W$ of the width of an individual is segmented by equal width according to Equation (1):

$$N_W = \text{floor}(W/T_W) \quad (1)$$

Step 3082 includes that a blob having a height of a circumscribed rectangle of the blob greater than twice a threshold $T_H$ of the height of an individual is segmented by equal height according to Equation (2):

$$N_H = \text{floor}(H/T_H) \quad (2)$$

In the foregoing equations, W and H represent the width and height of a circumscribed rectangle of a blob respectively, and floor is a rounding operation.

Step 3083 includes that a blob having an area smaller than a predetermined threshold is deleted, wherein the blob is acquired after the segmenting.

Step 3084 includes that two blobs having a centre-of-mass horizontal distance not exceeding $T_W$ and a centre-of-mass longitudinal distance not exceeding $T_H$ are combined.

Step 3085 includes that the width of a circumscribed rectangle of each acquired combined blob is introduced into Equation (1) to acquire $N_W$, and the height of the circumscribed rectangle is introduced into Equation (2) to acquire $N_H$, respectively.

Step 3086 includes that whether $N_W$ and $N_H$ of each combined blob are smaller than 2 is determined respectively; if greater than 2, then the combined blob is split, and if smaller than 2, then the combined blob is retained.

Step 3084 to Step 3086 are repeated until all blobs are combined.

Step 309 includes that tracking and counting are performed according to the centre-of-mass coordinate of each target blob in a detection area to acquire the number of pedestrians under the current monitoring scene.

Specifically, each target blob in the detection area is tracked using a nearest proximity matching algorithm, wherein a cost function applied by the nearest proximity matching algorithm is a Euclidean distance.

$$I(i,j)=\sqrt{(X_t^i-X_{t+1}^j)^2+(Y_t^i-Y_{t+1}^j)^2} \quad (3)$$

where $(X_t^i, Y_t^j)$ represents the centre-of-mass coordinate of a target blob i of the $t^{th}$ frame, and $(X_{t+1}^i, Y_{t+1}^j)$ represents the centre-of-mass coordinate of a target blob j of the $(t+1)^{th}$ frame.

While the tracking is performed, a tracker is created to record the coordinates of all trajectories of a target from appearance to disappearance in the detection area.

Provided that m target blobs $S_1, S_2 \ldots S_m$ are detected currently, and there are already n target blobs in the current frame which are respectively corresponding to trackers $T_1$, $T_2 \ldots T_n$; a specific matching algorithm is calculating a Euclidean distance $D=(D_1, D_2 \ldots D_n)$ between any target blob $S_1$ of the current frame and latest coordinates recorded by all trackers (i.e. the coordinate of a target matched and recorded by the last frame). If $d_j$=min(D) and $d_j<T_n$, then it is considered that a target blob corresponding to a tracker $T_j$ and Si are closest. $S_i$ is a location where the target blob corresponding to the tracker $T_j$ appears in the current frame. $S_i$ is added to $T_j$ so as to match a target and record the coordinate of a trajectory.

In a situation that a matching target blob of the current frame is not found in a nearest proximity matching process, if the target blob is located in a target appearance and disappearance area, then it is determined that the target blob is a new target blob, and a record of the new target blob is created by a tracker.

In a situation that a matching target blob corresponding to a tracker is found in a nearest proximity matching process, if the following conditions are satisfied: 1̂. the number (the length of the tracker) of frames of the target blob in the detection area is larger than a threshold; 2̂ the final coordinate of a tracking record is in a target appearance and disappearance area; 3̂ the displacement of the target blob is greater than a threshold, then an advancing direction is determined according to locations where the target blob appears and disappears, and a count is accumulated by a corresponding counter so as to acquire an accumulated value of pedestrians coming in and going out under the current monitoring scene.

Figure 4:
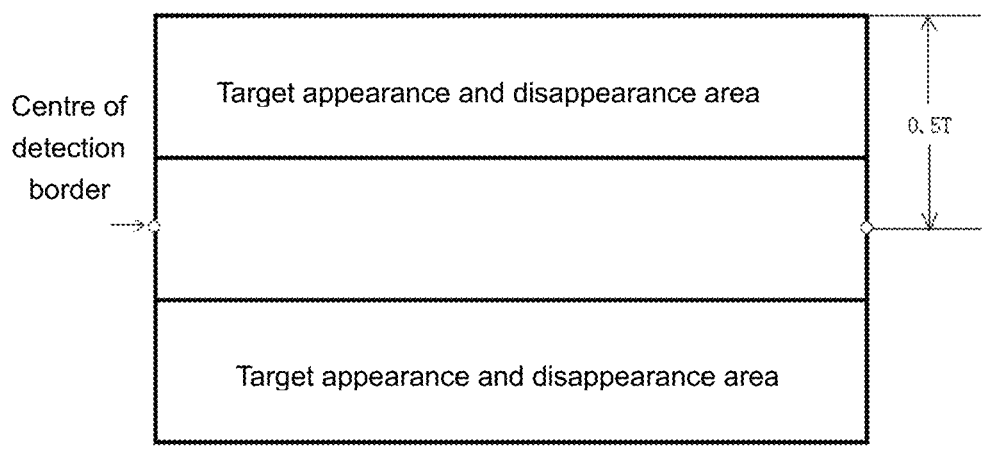
FIG. 4 is a schematic diagram of a detection area.
Figure 5:
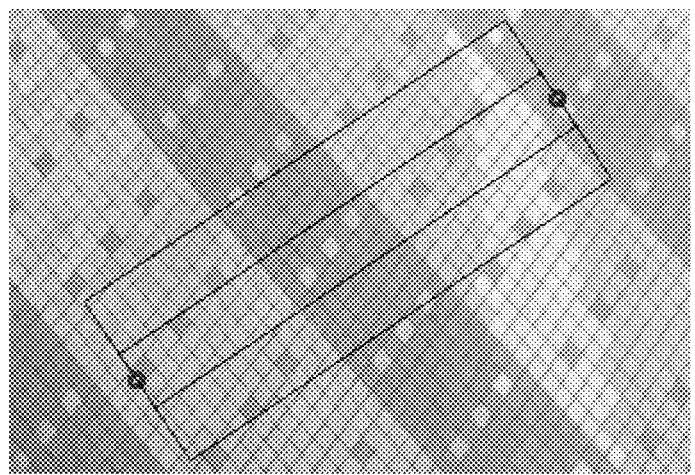
FIG. 5 is a schematic diagram of a detection area in a practical application scenario.

The detection area is generated according to the centres of two predetermined detection borders and a weight and height threshold T of a predetermined target pedestrian. The weight and height threshold T of the predetermined target pedestrian may be a relatively large value of weight and height thresholds of target pedestrians. Specifically, as shown in FIG. 4, a detection area is formed by an area extending from a line connecting two centres in two vertical directions for half of a target pedestrian weight and height threshold T. The detection area is divided into three equal areas in a direction parallel to the line connecting the two centres. Two areas at two ends are target appearance and disappearance areas. Detection borders of the detection area may not be parallel to a road direction, as shown in FIG. 5.

The foregoing descriptions are only preferred embodiments of the present disclosure and are not used for limiting the protection scope of the present disclosure.

What is claimed is:

1. A pedestrian tracking and counting method for a near-front top-view monitoring video, comprising:
   acquiring a video image under a current monitoring scene;
   comparing the video image with a background image, and when it is determined that the video image is a foreground image, segmenting and combining each blob in the foreground image to acquire a target blob representing an individual pedestrian;
   performing tracking and counting according to a centre-of-mass coordinate of each target blob in a detection area to acquire the number of pedestrians under the current monitoring scene,
   wherein segmenting each blob in the foreground image comprises:
   segmenting a blob having a width of a circumscribed rectangle of the blob greater than twice a threshold $T_W$ of a width of an individual by equal width according to $T_W$;
   segmenting a blob having a height of a circumscribed rectangle of the blob greater than twice a threshold $T_H$ of a height of an individual by equal height according to $T_H$;
   deleting a blob having an area smaller than a predetermined threshold, wherein the blob is acquired after the segmenting.

2. The method according to claim 1, wherein combining each blob in the foreground image comprises:
   combining two blobs having a centre-of-mass horizontal distance not exceeding $T_W$ and a centre-of-mass longitudinal distance not exceeding $T_H$;
   dividing a width of a circumscribed rectangle of each acquired combined blob by $T_W$ and then performing rounding to acquire a first value $N_W$, and dividing a height of the circumscribed rectangle by $T_H$ and then performing rounding to acquire a second value $N_H$;
   determining whether $N_W$ and $N_H$ of each combined blob are smaller than 2 respectively; if greater than 2, then splitting the combined blob; if smaller than 2, then retaining the combined blob; and
   repeating the three foregoing steps until all blobs are combined.

3. The method according to claim 1, after it is determined that the video image is a foreground image, the method further comprising:
   updating a background image and a background amplitude with different updating rate coefficients according to an image of a current frame.

4. The method according to claim 1, wherein performing tracking comprises:
   tracking each target blob in the detection area using a nearest proximity matching algorithm, wherein a cost function applied by the nearest proximity matching algorithm is a Euclidean distance.

5. A pedestrian tracking and counting device for a near-front top-view monitoring video, comprising:
   a video image acquiring unit, configured to acquire a video image under a current monitoring scene;
   a target blob acquiring unit, configured to compare the video image with a background image, and to, when it is determined that the video image is a foreground image, segment and combine each blob in the foreground image to acquire a target blob representing an individual pedestrian; and
   a pedestrian number counting unit, configured to perform tracking and counting according to a centre-of-mass coordinate of each target blob in a detection area to acquire the number of pedestrians under the current monitoring scene, wherein the target blob acquiring unit is configured to segment a blob having a width of a circumscribed rectangle of the blob greater than twice a threshold $T_W$ of a width of an individual by equal width according to $T_W$;

segment a blob having a height of a circumscribed rectangle of the blob greater than twice a threshold $T_H$ of a height of an individual by equal height according to $T_H$;

delete a blob having an area smaller than a predetermined threshold, wherein the blob is acquired after the segmenting.

6. The device according to claim 5, wherein the target blob acquiring unit is further configured to combine two blobs having a centre-of-mass horizontal distance not exceeding $T_W$ and a centre-of-mass longitudinal distance not exceeding $T_H$;

divide a width of a circumscribed rectangle of each acquired combined blob by $T_W$ and then perform rounding to acquire a first value $N_W$, and divide the height of the circumscribed rectangle by $T_H$ and then perform rounding to acquire a second value $N_H$;

determine whether $N_W$ and $N_H$ of each combined blob are smaller than 2 respectively; if greater than 2, then split the combined blob; if smaller than 2, then retain the combined blob; and repeat the three foregoing steps until all blobs are combined.

7. The device according to claim 5, further comprising:
an updating unit, configured to update a background image and a background amplitude with different updating rate coefficients according to an image of a current frame.

8. The device according to claim 5, wherein the pedestrian number counting unit is configured to track each target blob in the detection area using a nearest proximity matching algorithm, wherein a cost function applied by the nearest proximity matching algorithm is a Euclidean distance.

9. A pedestrian tracking and counting method for a near-front top-view monitoring video, comprising:
acquiring a video image under a current monitoring scene;
comparing the video image with a background image, and when it is determined that the video image is a foreground image, segmenting and combining each blob in the foreground image to acquire a target blob representing an individual pedestrian;
performing tracking and counting according to a centre-of-mass coordinate of each target blob in a detection area to acquire the number of pedestrians under the current monitoring scene,
wherein combining each blob in the foreground image comprises:
combining two blobs having a centre-of-mass horizontal distance not exceeding a threshold $T_W$ of a width of an individual and a centre-of-mass longitudinal distance not exceeding a threshold $T_H$ of a height of an individual;
dividing a width of a circumscribed rectangle of each acquired combined blob by $T_W$ and then performing rounding to acquire a first value $N_W$, and dividing a height of the circumscribed rectangle by $T_H$ and then performing rounding to acquire a second value $N_H$;
determining whether $N_W$ and $N_H$ of each combined blob are smaller than 2 respectively; if greater than 2, then splitting the combined blob; if smaller than 2, then retaining the combined blob; and
repeating the three foregoing steps until all blobs are combined.

10. The method according to claim 9, after it is determined that the video image is a foreground image, the method further comprising:
updating a background image and a background amplitude with different updating rate coefficients according to an image of a current frame.

11. The method according to claim 9, wherein performing tracking comprises:
tracking each target blob in the detection area using a nearest proximity matching algorithm, wherein a cost function applied by the nearest proximity matching algorithm is a Euclidean distance.

12. A pedestrian tracking and counting device for a near-front top-view monitoring video, comprising:
a video image acquiring unit, configured to acquire a video image under a current monitoring scene;
a target blob acquiring unit, configured to compare the video image with a background image, and to, when it is determined that the video image is a foreground image, segment and combine each blob in the foreground image to acquire a target blob representing an individual pedestrian; and
a pedestrian number counting unit, configured to perform tracking and counting according to a centre-of-mass coordinate of each target blob in a detection area to acquire the number of pedestrians under the current monitoring scene,
wherein the target blob acquiring unit is further configured to combine two blobs having a centre-of-mass horizontal distance not exceeding a threshold $T_W$ of a width of an individual and a centre-of-mass longitudinal distance not exceeding a threshold $T_H$ of a height of an individual;
divide a width of a circumscribed rectangle of each acquired combined blob by $T_W$ and then perform rounding to acquire a first value $N_W$, and divide the height of the circumscribed rectangle by $T_H$ and then perform rounding to acquire a second value $N_H$;
determine whether $N_W$ and $N_H$ of each combined blob are smaller than 2 respectively; if greater than 2, then split the combined blob; if smaller than 2, then retain the combined blob; and
repeat the three foregoing steps until all blobs are combined.

13. The device according to claim 12, further comprising:
an updating unit, configured to update a background image and a background amplitude with different updating rate coefficients according to an image of a current frame.

14. The device according to claim 12, wherein the pedestrian number counting unit is configured to track each target blob in the detection area using a nearest proximity matching algorithm, wherein a cost function applied by the nearest proximity matching algorithm is a Euclidean distance.

* * * * *